US012623947B2

(12) United States Patent
Gibson et al.

(10) Patent No.: US 12,623,947 B2
(45) Date of Patent: May 12, 2026

(54) INFRARED-TRANSMITTING, POLARIZATION-MAINTAINING OPTICAL FIBER AND METHOD FOR MAKING

(71) Applicant: The Government of the United States of America, as represented by the Secretary of the Navy, Arlington, VA (US)

(72) Inventors: Daniel J. Gibson, Falls Church, VA (US); Daniel Rhonehouse, Chesapeake Beach, MD (US); Shyam S. Bayya, Ashburn, VA (US); L. Brandon Shaw, Woodbridge, VA (US); Rafael R. Gattass, Washington, DC (US); Jesse A. Frantz, Washington, DC (US); Jason D. Myers, Alexandria, VA (US); Woohong Kim, Lorton, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 218 days.

(21) Appl. No.: 18/413,911

(22) Filed: Jan. 16, 2024

(65) Prior Publication Data
US 2024/0199468 A1     Jun. 20, 2024

Related U.S. Application Data

(62) Division of application No. 16/842,033, filed on Apr. 7, 2020, now Pat. No. 11,912,606.

(Continued)

(51) Int. Cl.
*C03B 37/012* (2006.01)
*C03B 37/023* (2006.01)
(Continued)

(52) U.S. Cl.
CPC .... *C03B 37/01217* (2013.01); *C03B 37/0122* (2013.01); *C03B 37/01222* (2013.01);
(Continued)

(58) Field of Classification Search
CPC ........ C03B 37/01217; C03B 37/02709; C03B 2203/30; C03B 2203/302; C03B 2203/32
See application file for complete search history.

(56) References Cited

U.S. PATENT DOCUMENTS

| | | | | | |
|---|---|---|---|---|---|
| 4,360,371 | A | * | 11/1982 | Blankenship | ..... C03B 37/01869 65/421 |
| 5,149,349 | A | * | 9/1992 | Berkey | ............. C03B 37/02754 65/410 |

(Continued)

FOREIGN PATENT DOCUMENTS

| | | | | | |
|---|---|---|---|---|---|
| CN | 105923988 | A | * | 9/2016 | ........... C03B 37/012 |
| CN | 117263513 | A | * | 12/2023 | ....... C03B 37/02709 |

OTHER PUBLICATIONS

CN-105923988-A (Jiang) Sep. 7, 2016 (English language translation). [online] [retrieved Jan. 14, 2026]. Retrieved from: Clarivate Analytics. (Year: 2016).*

(Continued)

*Primary Examiner* — Erin Snelting
(74) *Attorney, Agent, or Firm* — US Naval Research Laboratory; Stephen T. Hunnius

(57) ABSTRACT
This application relates generally to an optical fiber for the delivery of infrared light where the polarization state of the light entering the fiber is preserved upon exiting the fiber and the related methods for making thereof. The optical fiber has (Continued)

a wavelength between about 0.9 μm and 15 μm, comprises at least one infrared-transmitting glass, and has a polarization-maintaining (PM) transverse cross-sectional structure. The infrared-transmitting, polarization-maintaining (IR-PM) optical fiber has a birefringence greater than $10^{-5}$ and has applications in dual-use technologies including laser power delivery, sensing and imaging.

2 Claims, 10 Drawing Sheets

Related U.S. Application Data

(60) Provisional application No. 62/830,732, filed on Apr. 8, 2019.

(51) Int. Cl.

| | | |
|---|---|---|
| *C03B 37/027* | (2006.01) | |
| *C03C 25/005* | (2018.01) | |
| *C03C 25/106* | (2018.01) | |
| *G02B 6/10* | (2006.01) | |

(52) U.S. Cl.
CPC ...... *C03B 37/01225* (2013.01); *C03B 37/023* (2013.01); *C03B 37/02709* (2013.01); *C03B 37/0279* (2013.01); *C03C 25/005* (2013.01); *C03C 25/1063* (2018.01); *C03B 2201/86* (2013.01); *C03B 2203/302* (2013.01); *C03B 2203/34* (2013.01); *G02B 6/102* (2013.01)

(56) References Cited

U.S. PATENT DOCUMENTS

| | | | | |
|---|---|---|---|---|
| 6,360,565 | B1 * | 3/2002 | Christoff | C03B 37/02709 |
| | | | | 65/412 |
| 7,900,481 | B2 * | 3/2011 | Gallagher | C03B 37/01217 |
| | | | | 65/408 |
| 2007/0177846 | A1 * | 8/2007 | Chen | C03B 37/01413 |
| | | | | 385/127 |
| 2014/0212102 | A1 * | 7/2014 | Hoover | G02B 6/024 |
| | | | | 385/126 |
| 2020/0012041 | A1 * | 1/2020 | Ichii | C03B 37/02709 |

OTHER PUBLICATIONS

CN-117263513-A (Luo) Dec. 22, 2023 (English language translation). [online] [retrieved Jan. 13, 2026]. Retrieved from: Clarivate Analytics. (Year: 2023).*

* cited by examiner

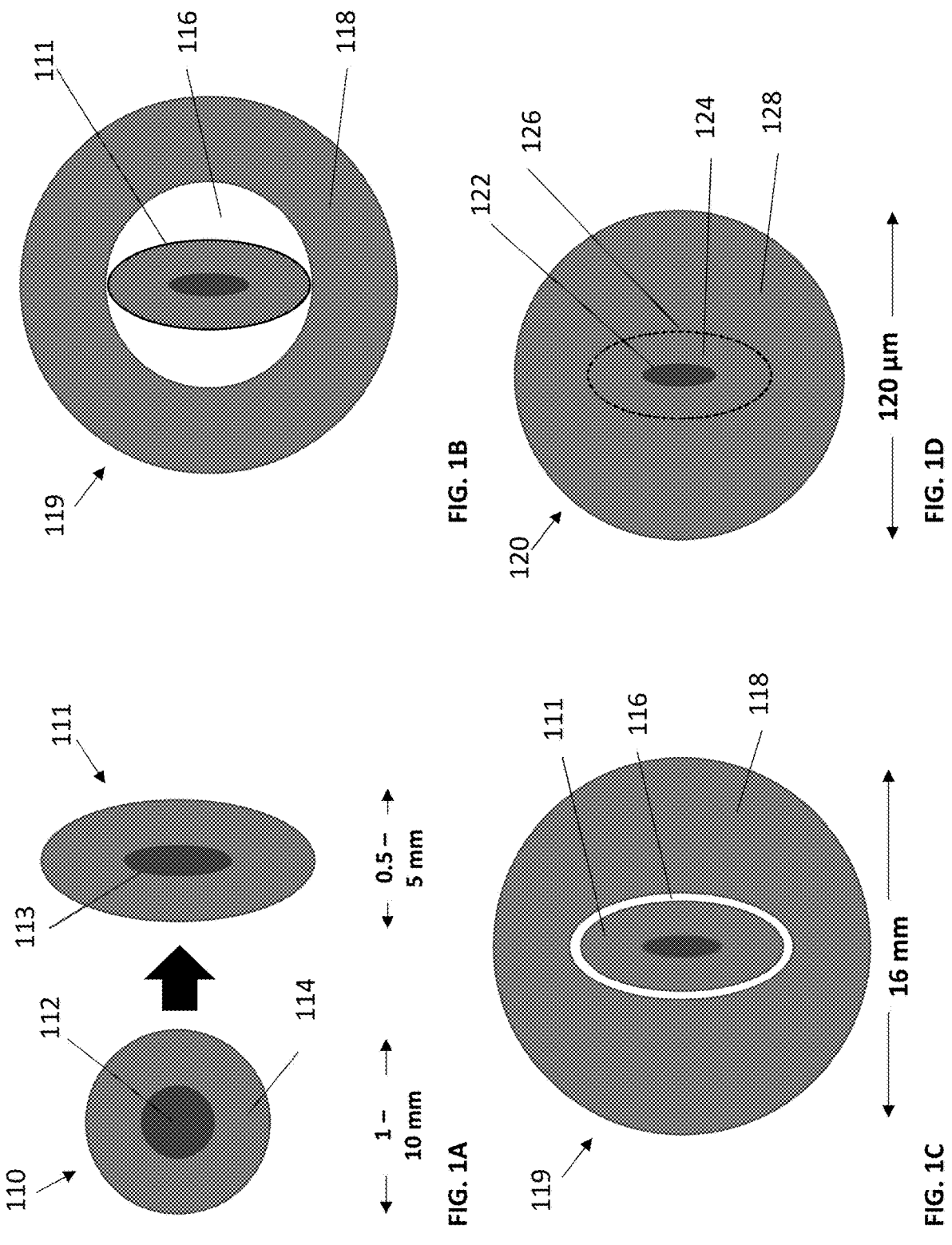

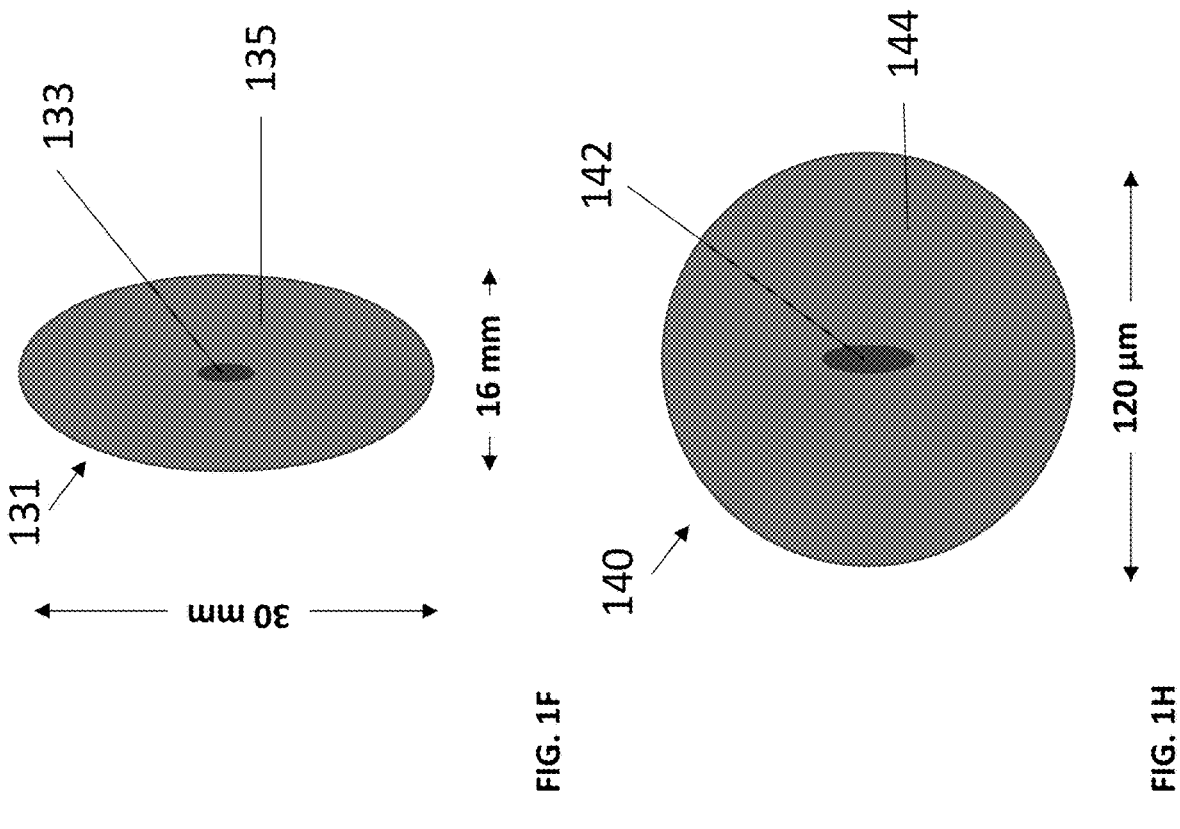
FIG. 1E
FIG. 1F
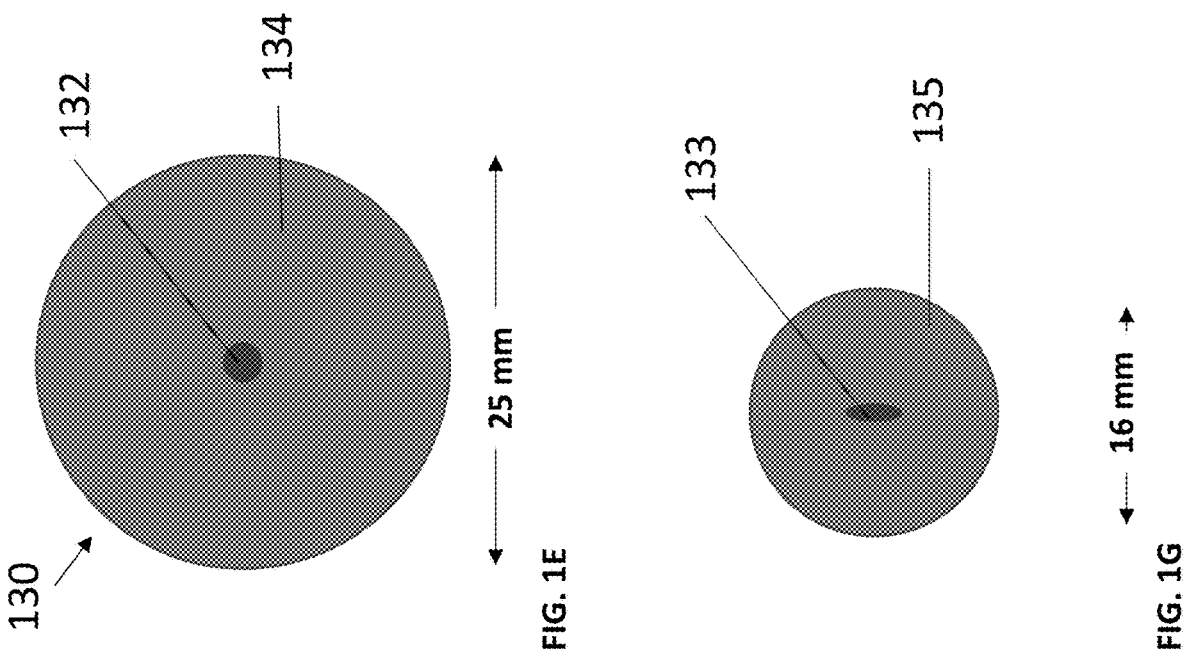
FIG. 1G
FIG. 1H

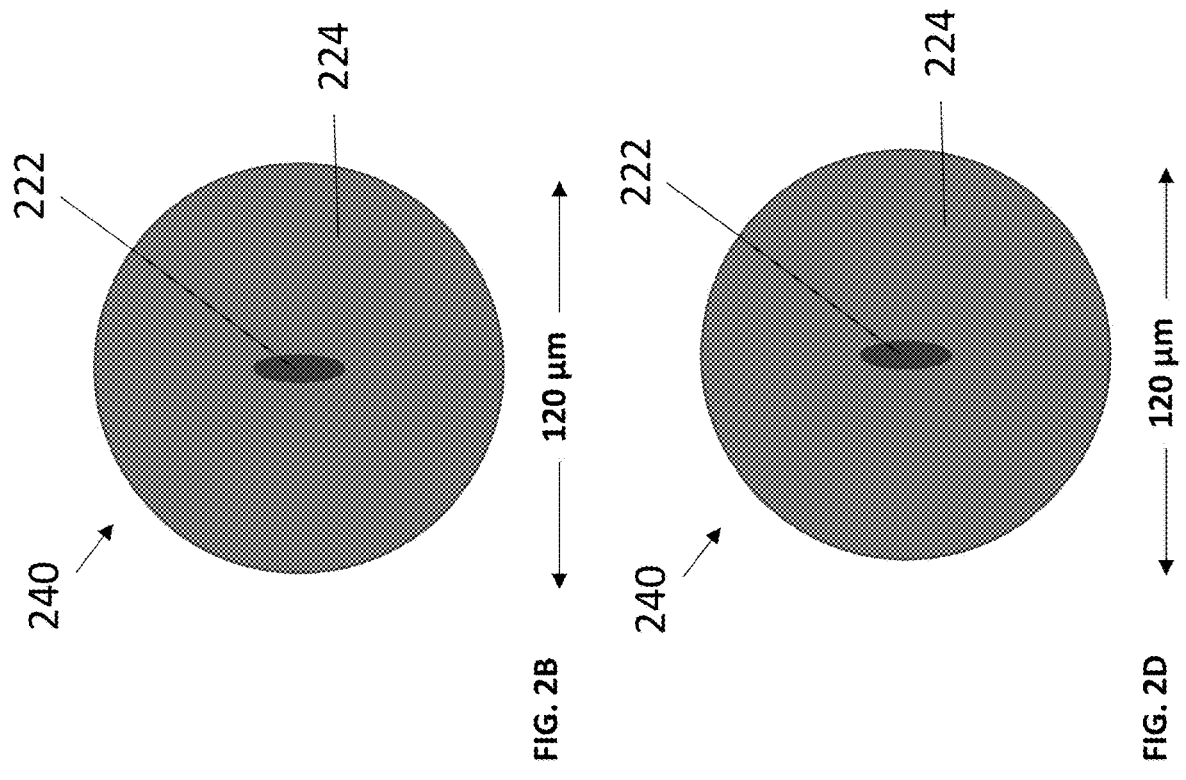
FIG. 2A
FIG. 2B
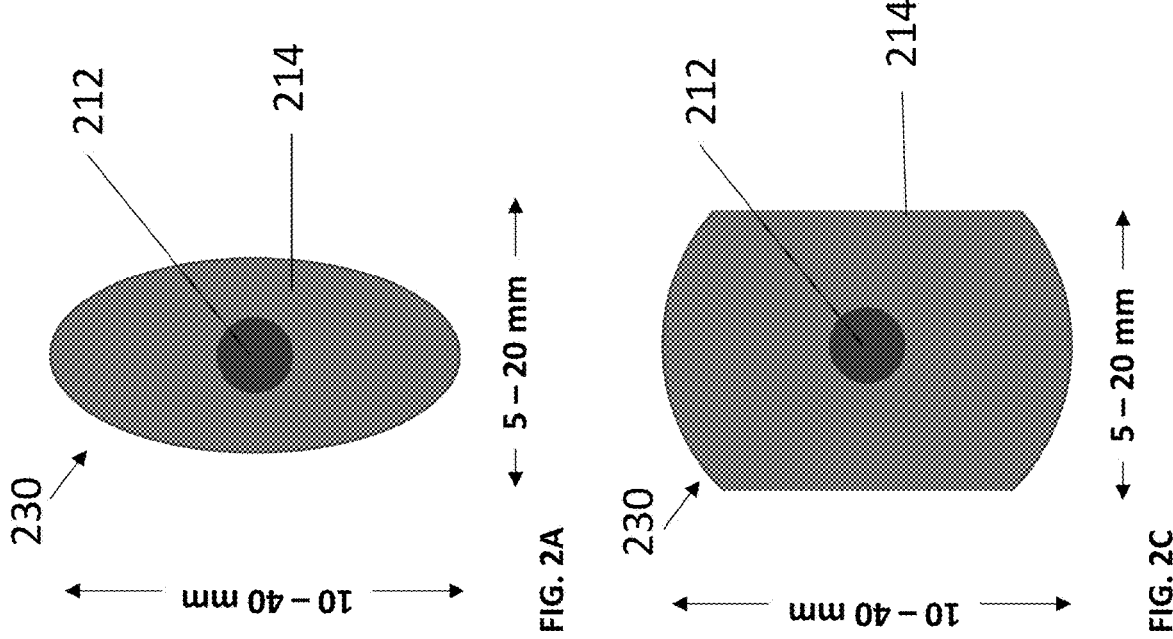
FIG. 2C
FIG. 2D

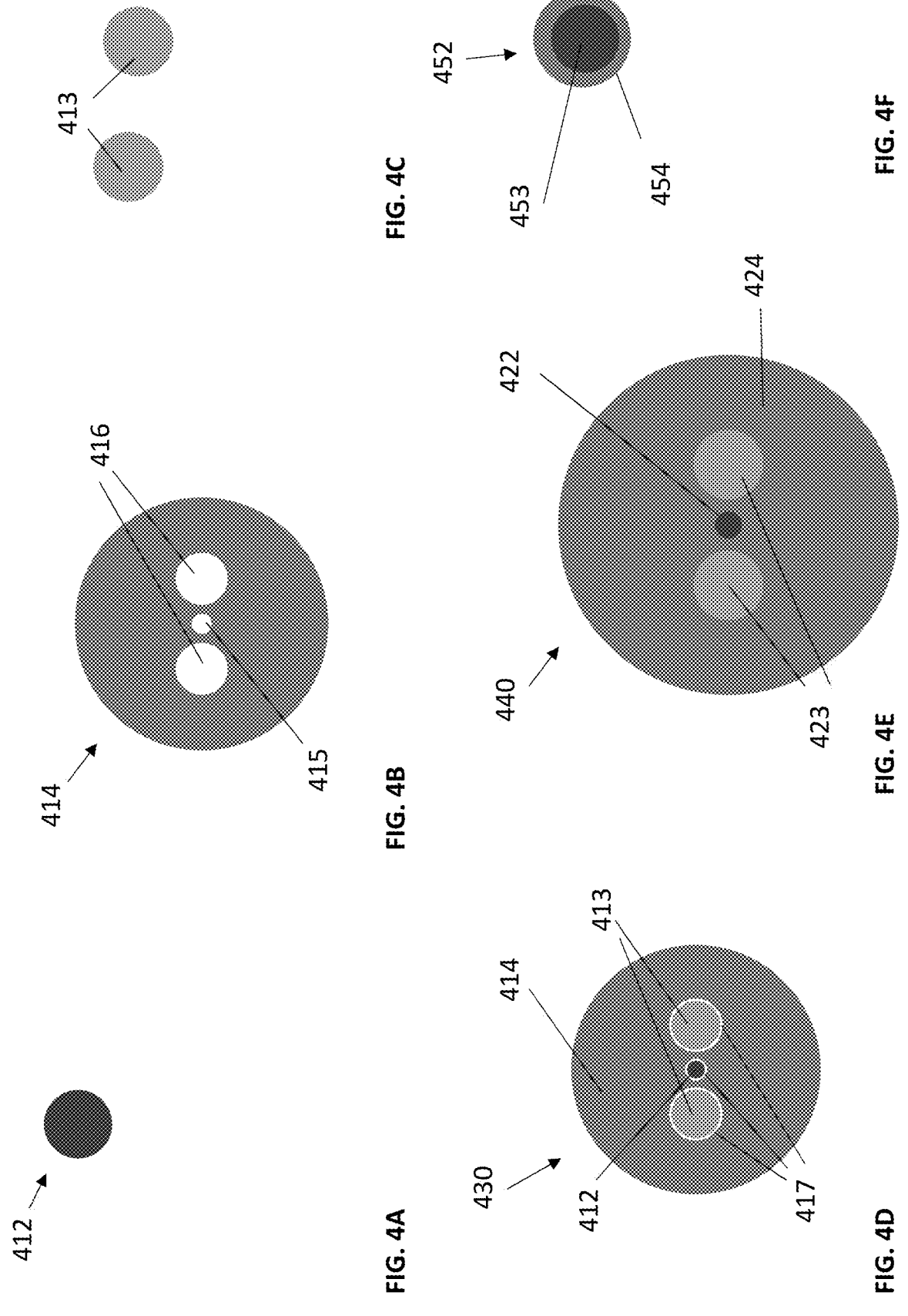

120 μm

6/10

120 μm

120 μm

120 μm

545

16 mm

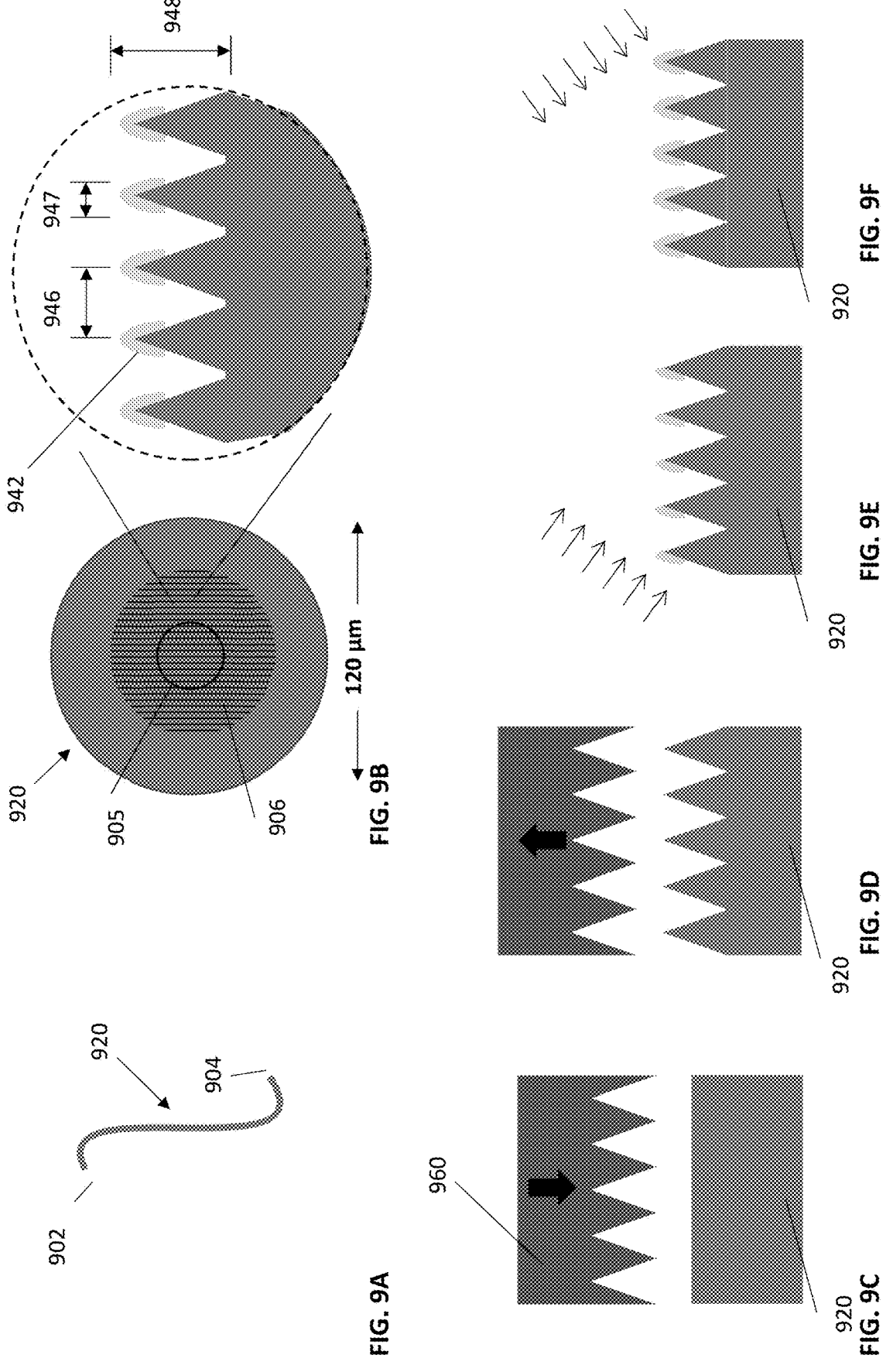

INFRARED-TRANSMITTING, POLARIZATION-MAINTAINING OPTICAL FIBER AND METHOD FOR MAKING

CROSS-REFERENCE TO RELATED APPLICATIONS

This application is a divisional application of U.S. application Ser. No. 16/842,033, filed on Apr. 7, 2020, which was a non-provisional application of U.S. Provisional Application No. 62/830,732, filed on Apr. 8, 2019, the contents of each are incorporated herein by reference in their entireties.

TECHNICAL FIELD

This application relates generally to an optical fiber for the delivery of infrared light where the polarization state of the light entering the fiber is preserved upon exiting the fiber and the related method for making. The optical fiber has a range of transmissible wavelengths between about 0.9 μm and 15 μm, comprises at least one infrared-transmitting glass, and has a polarization-maintaining (PM) transverse cross-sectional structure.

BACKGROUND OF THE INVENTION

Infrared (IR) fibers are used in many passive and active applications to transmit, generate, or modify infrared optical energy at wavelengths from as low as 0.9 μm to as high as 20 μm. Infrared fibers typically have axial symmetry which is agnostic with respect to the linear polarization state of the light transmitted therein. IR fibers, typically comprise a solid core region surrounded by a solid cladding region, usually surrounded by a protective coating. Solid-core IR fibers are made from IR-transmitting materials including chalcogenide glasses, fluoride glasses, and crystalline materials such as silver halides, thallium bromoiodide (KRS-5), sapphire, and yttrium aluminum garnet (YAG). This is in contrast to the more common silica glass optical fibers that transmit visible light and some near-infrared (NIR) light including wavelengths as low as about 400 nm to as high as about 1.8 μm.

Axially asymmetric optical fibers for visible wavelengths have been designed with physical features that impart modal birefringence such that orthogonal polarizations have different propagation constants and there is low mode-coupling or crosstalk between them. Many types of PM fibers have been demonstrated for visible and near-infrared (NIR) telecommunications wavelengths (400 nm-1800 nm), largely built upon silica glass with various dopants. However, no PM fiber has been developed for infrared wavelengths (2-20 μm), and there have been very few IR-PM fibers reported in the scientific literature and none are commercially available. The typical IR application space: laser power delivery, low data rate communications, chemical sensing and others, has not traditionally required these types of fibers and little effort has gone into their development beyond technological curiosity. It is worth noting that solid-core silica fibers do not transmit IR light well beyond about 2 μm due to the infrared absorption of silica, and PM silica fibers cannot be used at the wavelengths of interest (2-20 μm) in this invention.

Through analysis of thermal stress in silica PM fibers, Chu et al. derived functional forms for the resultant stress and the material birefringence due to the materials and geometry in common stress-induced birefringent silica-based PM fibers (Chu et al., "Analytical method for calculation of stresses and material birefringence in polarization-maintaining optical fiber," *J. Lightwave Technol., vol.* 2, no. 5, pp. 650-662 (1984)). They approximate the birefringence as $$B \cong \frac{2EC}{1-v}(\alpha_2 - \alpha_3)T\left(\frac{d_1}{d_2}\right)^2\left[1 - 3\left(1 - 2\left(\frac{r}{b}\right)^2\right)\left(\frac{d_2}{b}\right)^4 + 3\left(\frac{r}{d_2}\right)^2\cos 2\theta\right] \quad \text{(Eq. 1)}$$

where E is Young's modulus of the glass, C is the stress-optic coefficient of the glass, v is Poisson's ratio of the glass, $\alpha_2$ is the thermal expansion coefficient of the cladding glass, $\alpha_3$ is the thermal expansion coefficient of the stressor glass, T is the temperature difference between the fiber drawing and room temperatures, $d_1$ is the half diameter or radius of each circular stressor member, $d_2$ is the distance from the center of each stressor member and the center of the fiber core, b is the half diameter or radius of the fiber cladding and r and $\theta$ are the usual radial coordinates. The magnitude of the birefringence is therefore strongly dependent on the materials available to the fiber engineer and the fiber drawing temperature, which for silica-based fibers is very large.

The fibers of the present invention comprise non-silica-containing glasses including chalcogenide glasses, comprising at least one chalcogen element excluding oxygen (S, Se, Te); chalcohalide glasses, comprising at least one chalcogen element excluding oxygen (S, Se, Te) and at least one halogen element (F, Cl, Br, I); fluoride glasses, comprising fluorine and at least one other element (e.g. ZBLAN); and heavy-metal oxide glasses comprising oxygen and at least one metal element excluding silicon (e.g. $GeO_2$—$TeO_2$). It should be apparent to one skilled in the art of fiber optics and specifically the art of infrared fiber optics that one cannot simply replace silica with a more suitable IR-transmitting glass to make an IR-PM fiber as the material properties (Young's modulus, stress-optic coefficient, Poisson's ratio, thermal expansion coefficient, softening temperature and others) needed to do so are not available in commercially available infrared glasses and the birefringence attainable using such glasses is therefore very low and not usable for IR-PM fiber. For example, the softening temperature of infrared glasses in general and chalcogenide glasses more specifically is very low (200-400° C.) in comparison to silica which is drawn into fiber at 1900° C. The T term in Equation 1 above is therefore about 5 to 10 times greater for silica fibers than chalcogenide fibers. The Young's modulus of silica is about 5 times greater than that of chalcogenide glasses. Silica has a very low thermal expansion coefficient but it is possible to increase the thermal expansion with the addition of other elements as dopants to be used as stressor members resulting in a large ($\alpha_2$-$\alpha_3$) term for silica PM fibers. Chalcogenide glasses typically have a thermal expansion coefficient about 40 times larger than silica and, unlike silica, even small chemistry changes can greatly impact the softening temperature making modification of $\alpha_3$ through doping impractical in a PM fiber based on chalcogenide glasses. Thus the ($\alpha_2$-$\alpha_3$) term for a silica PM fiber is about 2 to 5 times larger than for a hypothetical chalcogenide PM fiber. Combined the maximum birefringence for a PM silica fiber is about 50 to 250 times larger than for a hypothetical chalcogenide PM fiber of the same design. Additionally, chalcogenide fibers become quite weak when stressed reducing the practical birefringence of a chalcogenide glass PM fiber even lower.

Infrared (IR) transmitting fibers are commonplace in specialty applications and can be solid-core or hollow-core. Solid-core IR fibers are made from IR-transmitting materials including chalcogenide glasses, fluoride glasses, and crystalline materials such as silver halides, thallium bromoiodide (KRS-5), sapphire, and yttrium aluminum garnet (YAG). Solid-core IR fibers can have a structure similar to core-clad fibers used in visible-NIR applications, with a solid core surrounded by a solid cladding that is surrounded by a protective material (often a photo-cured or thermal-cured polymer), but can also have a micro-structured cladding wherein the core is surrounded by a series of holes or voids disposed within a second solid material, that can be the same or similar to the core material. The second type is often called a micro-structured optical fiber (MOF) or a photonic crystal fiber (PCF) if the holes are positioned in some regular arrangement. The arrangement of voids in a MOF can be used to impart birefringence in the fiber (Ortigosa-Blanch et al., "Highly birefringent photonic crystal fibers," *Opt. Lett.*, vol. 25, no. 18, pp. 1325-1327 (2000)) and has been demonstrated in fibers made from an IR glass (Caillaud et al., "Highly birefringent chalcogenide optical fiber for polarization-maintaining in the 3-8.5 μm mid-IR window," *Opt. Exp.*, vol. 24, no. 8, pp. 7977-7986 (2016)). The terms MOF and PCF are often used interchangeably, even though PCF connotes a precise ordered arrangement of optical elements in the fiber and is more technically a subset or type of MOF.

Solid-core IR-transmitting fibers made from chalcogenide glasses are most often formed using one of two methods: a preform drawing process or a double-crucible process (DCP). Fibers made from DCP have lower optical losses due to precision geometry (minimizes waveguide losses) and very low impurities (minimizes extrinsic material absorptions). A double crucible is a device comprising a pair of concentric crucibles, called the core crucible and clad crucible, each connected to its own hopper for supplying glass, each having an exit aperture or tip with a substantially circular transverse cross-sectional shape. The double crucible fiber drawing process is a method comprising loading a core glass into the core glass hopper, loading a cladding glass into the clad glass hopper, heating the glasses to soften them and transfer at least some of each glass to its crucible, substantially filling both crucibles, introducing an inert gas to each sealed hopper at controlled pressures and rates such that core and cladding glass exit the crucibles at their tips and contact each other without any gap between them and the glass is continuously pulled from the crucible forming a fiber having a core comprising the core glass and a clad comprising the cladding glass. When the fiber exiting the double crucible process has an outer diameter larger than about 0.5 mm it is often called a cane because it is typically less flexible than a fiber. Canes can be used in waveguiding applications or used as components in another assembly that may be drawn into fiber including but not limited to MOF.

In hollow-core IR fibers, light propagates within a hollow void surrounded by one or more materials that confine the light to the hollow core. The confining material can be a metal such as silver, often with a reflection enhancing dielectric coating applied to it, or a dielectric that has anomalous dispersion (refractive index less than unity) for the wavelength range of interest (such as sapphire at 10.6 μm), or a dielectric with a series of holes or voids disposed therein such that the voids form a periodic structure with a photonic band gap (PBG) at the wavelength range of interest. In the PBG fiber, light is confined to a hollow core by virtue of the surrounding photonic crystal structure having a bandgap corresponding to the frequency of the light being transmitted, such that light cannot propagate through the PBG cladding. More recently, another class of hollow MOF, the so-called inhibited coupling (IC) fiber has been the subject of much research (Argyros et al., "Antiresonant reflection and inhibited coupling in hollow-core square lattice optical fibres," *Opt. Exp.*, vol. 16, no. 8, pp. 5642-7 (2008) and Wei et al., "Negative curvature fibers," *Adv. Opt. Photon.*, vol. 9, no. 3, pp. 504-561 (2017)). IC fiber does not confine light to the hollow core using a bandgap, but does so by inhibiting coupling of the electromagnetic modes of the fiber core and those within the glass comprising the cladding. Typically, IC fibers have a plurality of thin-walled round tube members arranged in a circle and evenly spaced such that they are not touching each other, but are touching a common support tube surrounding them. The void formed at the center of these members comprises the fiber core having a boundary with a complex or negative curvature. Because of this feature, these fibers are also called negative curvature fibers (NCF) (Belardi et al., "Effect of core boundary curvature on the confinement losses of hollow antiresonant fibers," *Opt. Exp.*, vol. 21, no. 19, p. 21912 (2013) and Gattass et al., "Infrared glass-based negative-curvature antiresonant fibers fabricated through extrusion," *Opt. Exp.*, vol. 24, no. 22, pp. 25697-25703 (2016)). Other names commonly used are frustrated or anti-resonant fibers (ARFs) and tube lattice fibers (TLFs) (Setti et al., "Flexible tube lattice fibers for terahertz applications," *Opt. Exp.*, vol. 21, no. 3, pp. 3388-3399 (2013)). Anti-resonant fibers can be designed with birefringence for PM applications although none have been demonstrated (Wei et al., "Polarization-filtering and polarization-maintaining low-loss negative curvature fibers," *Opt. Exp.*, vol. 26, no. 8, pp. 9528-13 (2018); Vincetti et al., "Elliptical hollow core tube lattice fibers for terahertz applications," *Optical Fiber Technology*, vol. 19, no. 1, pp. 31-34 (2013); and Mousavi et al., "Broadband high birefringence and polarizing hollow core antiresonant fibers," *Opt. Exp.*, vol. 24, no. 20, pp. 22943-16 (2016)).

Caillaud et al. demonstrated polarization-maintaining chalcogenide glass micro-structured optical fiber (MOF) for 3-8.5 μm in the infrared (Caillaud et al., "Highly birefringent chalcogenide optical fiber for polarization-*maintaining in the* 3-8.5 μm mid-IR window," *Opt. Exp.*, vol. 24, no. 8, pp. 7977-7986 (2016)). Their fiber comprises a solid core surrounded by 3 rings of air-holes with diameter, d=7.64 μm, arranged in a hexagonal lattice having a lattice pitch, Λ, disposed within a solid As—Se based glass such that the hole-to-pitch ratio, d/Λ, is 0.45, and having a pair of larger holes with diameter, dh, adjacent to and on opposing sides of the core, such that the hole to pitch ratio for the larger holes, dh/Λ, is 0.84. In this example, the authors utilize a molten glass casting method wherein the As—Se glass is melted to low viscosity ($10^{-4}$ PaS) and cast into a mold comprising a lattice of thin walled silica capillaries. After casting, the silica capillaries are removed by acid etching. This method is not compatible with other chalcogenide glasses because they have strong adhesion to silica and fracture during cooling (Coulombier et al., "Casting method for producing low-loss chalcogenide microstructured optical fibers," *Opt. Exp.*, vol. 18, no. 9, pp. 9107-9112 (2010)).

Gao et al. show a ZBLAN fiber with elliptical core and extinction ratio of about 6.7 dB over 10 m (Gao et al., "Third-harmonic generation in an elliptical-core ZBLAN fluoride fiber," *Opt. Lett.*, vol. 38, no. 14, pp. 2566-3 (2013)).

Yao et al. demonstrate $TeO_2$—$BaF_2$—$Y_2O_3$ wagon wheel, suspended core fiber where the core is elliptical and therefore birefringent (Yao et al., "Mid-infrared dispersive waves generation in a birefringent fluorotellurite microstructured fiber," *Appl. Phys. Lett.*, vol. 109, no. 10, pp. 101102-6 (2016)). Although the authors do not show the transmission spectrum for the fiber, fluorotellurite fibers may transmit visible and MWIR 0.4-6 μm depending on the composition and impurities present.

Gibson et al. demonstrate polarization-maintaining infrared air-core waveguide with a rectangular bore (225×1250 μm) with a length of 125 cm transmitting 10.6 μm light (Gibson et al., "Polarization-maintaining hollow glass waveguides with noncircular bore," *Opt. Eng.*, vol. 43, p. 568 (2004)). The air core was surrounded by a silver-iodide coated silver mirror that was supported by borosilicate glass tubing substrate.

Sharma et al. propose but do not demonstrate a birefringent IR PCF based on ZBLAN (Sharma et al., "Wavelength-tunable mid-infrared femtosecond Raman soliton generation in birefringent ZBLAN photonic crystal fiber," *Journal of Modern Optics* (2016)). The PCF comprises a square lattice of air holes disposed within a ZBLAN glass fiber, the central core is solid ZBLAN, and a pair of larger air holes adjacent to and on opposing sides of the solid core.

Sultana et al. propose designs for, but do not demonstrate, highly birefringent PCF for terahertz comprising a polymer (Topas) and a hexagonal lattice of air-holes surrounding a core (Sultana et al., "Highly birefringent elliptical core photonic crystal fiber for terahertz application," *Optics Communications*, vol. 407, pp. 92-96 (2018)). The core is solid polymer with five elliptical air holes, each spanning the entire core and evenly spaced with their fast axes co-aligned. The high-aspect ratio air holes within the core impart birefringence in this design.

Dabas et al. propose but do not demonstrate a chalcogenide glass PCF with high birefringence (Dabas et al., "Design of highly birefringent chalcogenide glass PCF: A simplest design," *Optics Communications*, vol. 284, no. 5, pp. 1186-1191 (2011)). Their fiber design comprises a solid core surrounded by seven rings of air holes each having a diameter, d, arranged in a hexagonal lattice having a lattice pitch, $\Lambda$, disposed within a solid $As_2Se_3$ based glass such that the hole-to-pitch ratio, $d/\Lambda$, is controlled and having a pair of larger holes with diameter, $d_2$, in the first ring and adjacent to and on opposing sides of the core, such that the lattice positions of the larger holes and the core position are in a line forming a transverse axis, as well as a second pair of smaller holes with diameter $d_1$, in the second ring around the core such that the lattice positions of the smaller holes and the core position are in a line forming an second axis orthogonal to the transverse axis and $d_1 < d < d_2$. They disclose a fiber optimized for large birefringence having d=1.1 μm, $d_1$=0.45 μm, $d_2$=2.4 μm and $\Lambda$=2.2 μm.

Zhang et al. propose but do not demonstrate a mid-infrared transmitting birefringent PCF with chalcogenide glass, $65Ga_2S_3$-$32La_2S_3$-$3La_2O_3$ (GLS) comprising a series of air holes having diameter do arranged on a hexagonal lattice with pitch A, having a solid high-aspect ratio core occupying three lattice positions in the center of the fiber, a pair of smaller holes adjacent to the core coincident with the core long axis and having diameter $d_c$, and a number of larger air holes occupying the lattice positions along the and having diameter $d_v$ (Zhang et al., "Properties of high birefringence chalcogenide glass holey fibre for mid-infrared transparency," *J. Opt.*, vol. 12, no. 3, pp. 035207-8 (2010)).

SUMMARY OF THE INVENTION

The invention described herein, including the various aspects and/or embodiments thereof, meets the unmet needs of the art, as well as others, by providing an infrared-transmitting, polarization-maintaining (IR-PM) optical fiber and methods for making thereof. In one embodiment, the fiber is made by forming a cane comprising an infrared-transmitting, non-silica glass, compressing the cane so that it has an approximately elliptical transverse cross-section and core, inserting the compressed cane into a tube to form an assembly, and stretching the assembly into a fiber that is approximately round with an approximately elliptical core where the fiber has a birefringence greater than $10^{-5}$.

In one embodiment, the fiber is made by making a preform with an approximately round cross-sectional shape comprising an approximately round core surrounded by a cladding where the preform comprises an infrared-transmitting, non-silica glass, compressing the preform so both the core and cladding have an approximately elliptical shape, altering the compressed preform by grinding, polishing, and/or machining to form an approximately round cladding, and drawing the altered preform into a fiber that is approximately round with an approximately elliptical core where the fiber has a birefringence greater than $10^{-5}$.

In one embodiment, the fiber is made by making a preform with a core having an approximately circular cross-sectional shape and comprising a first infrared-transmitting, non-silica glass and a cladding surrounding the core where the cladding comprises a second infrared-transmitting, non-silica glass and has a cross-sectional shape that is not a circle. The preform is drawn into a fiber that is approximately round with an approximately elliptical core where the fiber has a birefringence greater than $10^{-5}$. During the drawing step, the preform is held vertically and heated in a fiber drawing oven until one end of the preform slumps and forms a tapered section and a drop, and then the drop is pulled at a controlled rate. The temperature of the preform in the tapered section is between 50 and 150° C. greater than the glass transition temperature of the preform glass, and the viscosity of the preform glass is $10^4$-$10^6$ Poise.

In one embodiment, the fiber is made by providing a double crucible having a core crucible and a clad crucible where at least one of the crucibles has an approximately elliptical shaped cross-sectional exit aperture, loading a first infrared-transmitting, non-silica glass into the core crucible, loading a second infrared-transmitting, non-silica glass into the clad crucible, forming a glass with a core surrounded by a cladding, and drawing a fiber that is approximately round with an approximately elliptical core where the fiber has a birefringence greater than $10^{-4}$.

In one embodiment, the fiber is made by making a core cane comprising a first infrared-transmitting, non-silica glass, making a cladding preform comprising a second infrared-transmitting, non-silica glass where the cladding preform comprises a plurality of openings, making at least two stressor canes comprising a third infrared-transmitting non-silica glass, forming an assemblage comprising the core cane and stressor canes inserted into the openings in the cladding preform, and stretching the assemblage into a fiber where the fiber has a birefringence greater than $10^{-4}$.

In one embodiment, the fiber is made by making a preform comprising an infrared-transmitting, non-silica glass where the preform has a solid core and a plurality of openings and drawing the preform into a fiber comprising a solid care and a series of longitudinal air-holes arranged in a lattice where the fiber has a birefringence greater than $10^{-4}$.

This invention provides IR-PM fibers that are not available elsewhere. IR-PM fibers have applications in dual-use technologies including laser power delivery, sensing and imaging. Notable applications of interest include routing of high power laser energy for infrared countermeasures and directed energy.

Other features and advantages of the present invention will become apparent to those skilled in the art upon examination of the following or upon learning by practice of the invention.

BRIEF DESCRIPTION OF THE DRAWINGS

FIGS. 1A-1H show an elliptical core polarization maintaining (PM) fiber and the cane or preform thereof. FIG. 1A shows a cane being compressed to form an elliptical transverse cross-section. FIG. 1B shows a compressed cane inside a jacket tube with a round hole. FIG. 1C shows a compressed cane inside a jacket tube with an elliptical hole. FIG. 1D shows a fiber formed by stretching the cane and tube assembly on a fiber optic drawing tower. FIG. 1E shows a core-clad preform with a round transverse cross-sectional shape. FIG. 1F shows the preform of FIG. 1E after being compressed perpendicular to the preform axis to deform the cross-sectional shape of both the core and cladding into an elliptical shape. FIG. 1G shows the preform of FIG. 1F after the cross-sectional shape of the cladding is made round by grinding, polishing and/or machining. FIG. 1H shows the fiber drawn from the preform shown in FIG. 1G in a manner consistent with rod-in-tube preform drawing.

FIGS. 2A-2D show an IR-PM preform and fiber with an elliptical core driven by surface tension. FIG. 2A shows a preform comprising a core having a circular transverse cross-sectional shape surrounded by a cladding having a transverse cross-sectional shape that is elliptical. FIG. 2B shows an IR-PM fiber having an elliptical core fabricated by stretching the preform shown in FIG. 2A on a fiber optic draw tower. FIG. 2C shows a preform comprising a core having a circular transverse cross-sectional shape surrounded by a cladding having a transverse cross-sectional shape that is approximately circular but with two truncated or flattened sides. FIG. 2D shows an IR-PM fiber having an elliptical core fabricated by stretching the preform shown in FIG. 2C on a fiber optic draw tower.

FIG. 3A shows the tip shape of a core crucible having a round transverse shape and a clad crucible having an elliptical transverse shape. FIG. 3B shows a glass upon exiting the tip to provide a round shape to the fiber core glass and an elliptical shape to the fiber clad glass upon exit from the crucible tip. FIG. 3C shows an IR-PM fiber having a solid core with an elliptical transverse cross-sectional shape drawn using the DCP with the glass exiting tip shown in FIG. 3B. FIG. 3D shows the tip shape of a core crucible having an elliptical transverse shape and a clad crucible having a round transverse shape. FIG. 3E shows a glass upon exiting the tip to provide an elliptical shape to the fiber core glass and a round shape to the fiber clad glass upon exit from the crucible tip. FIG. 3F shows an IR-PM fiber having a solid core with an elliptical transverse cross-sectional shape drawn using the DCP with the glass exiting tip shown in FIG. 3E.

FIGS. 4A-4F show an IR-PM fiber with stress-induced birefringence and elements thereof. FIG. 4A shows a core cane. FIG. 4B shows a cladding preform having multiple openings. FIG. 4C shows a pair of stressor canes. FIG. 4D shows an assemblage comprising the core cane and stressor canes inserted into the cladding preform. FIG. 4E shows an IR-PM fiber that was stretched from the assemblage shown in FIG. 4D. FIG. 4F shows a core cane having an outer coating.

FIG. 5A shows a preform having a solid core comprising a series of longitudinal air-holes arranged in a lattice surrounding the core. FIG. 5B shows an IR-PM MOF where the core is birefringent by means of a pair of air-holes on either side of the core having a diameter larger than the diameter of the rest of the holes. FIG. 5C shows an IR-PM MOF where the core is birefringent by means of all holes on either side of and colinear with the core having a diameter larger than the diameter of the rest of the holes. FIG. 5D shows an IR-PM MOF where the core is birefringent by means of a second IR-transmitting glass having a refractive index lower than the first IR-transmitting glass taking the place of a pair of air holes on either side of the core. FIG. 5E shows an IR-PM MOF where birefringence is provided by means of substitution of the IR-transmitting glass in place of two air holes adjacent to and colinear to the core.

FIG. 6A shows a preform comprising a first IR-transmitting glass having a solid core comprising a series of longitudinal solid rods comprising a second IR-transmitting glass arranged in a lattice surrounding the core. FIG. 6B shows an IR-PM solid MOF where the core is birefringent by means of a pair of rods on either side of the core having a diameter larger than the diameter of the rest of the rods. FIG. 6C shows an IR-PM solid MOF where the core is birefringent by means of all rods on either side of and colinear with the core having a diameter larger than the diameter of the rest of the rods. FIG. 6D shows an IR-PM solid MOF where the core is birefringent by means of a third IR-transmitting glass taking the place of a pair of rods on either side of the core. FIG. 6E shows an IR-PM solid MOF where birefringence is provided by means of substitution of the first IR-transmitting glass in place of two rods adjacent to and colinear the core. FIG. 6F shows an IR-PM solid MOF where a pair of air holes are adjacent to and on either side of the core.

FIG. 7A shows an IR-PM anti-resonant fiber comprising a first IR-transmitting glass and having a cladding comprising a series of four tube-like structures arranged in a circular configuration in a single layer, such that adjacent tubes do not touch each other and are separated by a space and being attached to an outer cladding tube, where the fiber has a hollow core region. FIG. 7B shows an IR-PM anti-resonant fiber with a hollow core region having a diameter defined by the space between the tubes comprising the cladding, where two of the cladding tubes, B-tubes, colinear with each other and the core region are different from the other tubes, A-tubes, and where the A-tubes have a different wall thickness than the B-tubes. FIG. 7C shows an IR-PM anti-resonant fiber where the A-tubes comprise a first IR-transmitting glass, and the B-tubes comprise a second IR-transmitting glass and both sets of tubes have the same wall thickness. FIG. 7D shows an IR-PM anti-resonant fiber where the A-tubes comprise a first IR-transmitting glass, the B-tubes comprise a second IR-transmitting glass, both sets of tubes have the same wall thickness, and there are an unequal amount of A-tubes and B-tubes. FIG. 7E shows an IR-PM anti-resonant fiber where the A-tubes comprise a first IR-transmitting glass, the B-tubes comprise a second IR-transmitting glass, the A-tubes have a different wall thickness than the B-tubes, and the tubes are nested tubes where an inner tube is joined to an outer tube at the same attachment point that joins the outer tube to the outer cladding tube.

FIG. 8A shows a circular IR-PM fiber having a solid core comprising a first IR-transmitting glass surrounded by a cladding comprising a second IR-transmitting glass, and having two stressor members comprising a third glass. FIG. 8B shows how the stressor members are coiled around the fiber core for the fiber shown in FIG. 8A.

FIGS. 9A-9F show an IR fiber with an endface polarizer. FIG. 9A shows an IR fiber having a proximal endface and a distal endface. FIG. 9B shows an IR fiber having an endface with polarizing features. FIG. 9C shows a mold with ridges and valleys to be pressed into an IR fiber. FIG. 9D shows ridges and valleys formed on an endface of an IR fiber by nano-indenting where a mold is pressed into the fiber endface and then removed. FIGS. 9E and 9F show the deposition of a conductive metal onto the ridges of the IR fiber shown in FIG. 9D at an angle such that the ridges block part of the valleys thereby precluding deposition on part of the structure. FIG. 9E shows the metal being deposited in a first direction, and FIG. 9F shows the metal being deposited a second time in a second direction, which is opposite of the first direction.

DETAILED DESCRIPTION OF EMBODIMENTS OF THE INVENTION

Figures 3A, 3B, 3C, 3D, 3E, 3F:
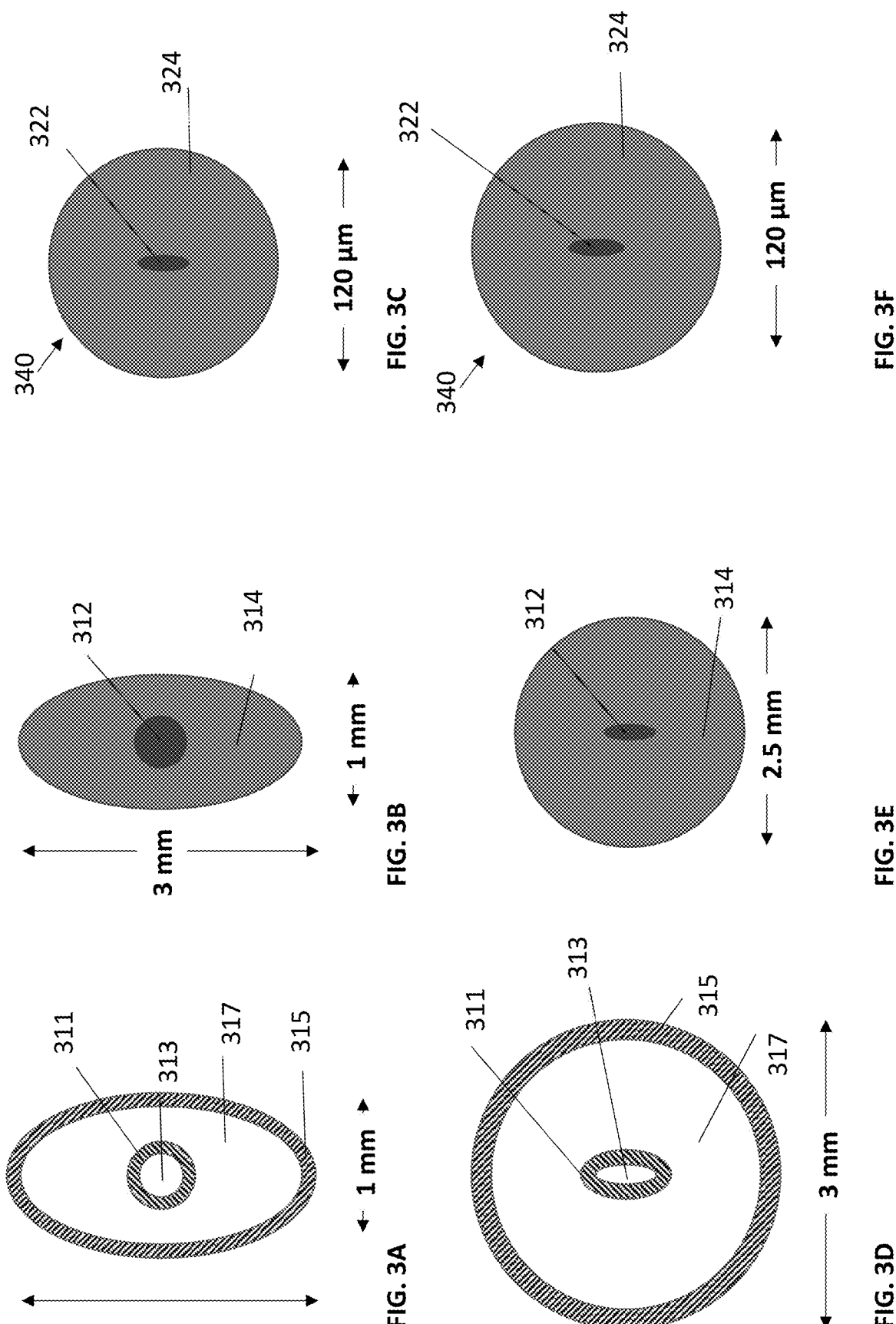
FIGS. 3A-3F show an elliptical core IR-PM fiber drawn using the double crucible process (DCP) and the tip shape and glass exiting tip thereof.

The invention described herein, including the various aspects and/or embodiments thereof, meets the unmet needs of the art, as well as others, by providing IR-transmitting polarization maintaining (IR-PM) optical fibers, and methods of making them. The fibers of the present invention comprise IR-transmitting, non-silica-containing glasses including but not limited to chalcogenide glasses comprising at least one chalcogen element excluding oxygen (S, Se, Te), heavy-metal oxide glasses (based on oxides of Te, Ge, Pb, La or others), fluoride glasses, and any combination thereof.

Fiber and Method 1: IR-PM Fiber with Elliptical Core by Preform Drawing

FIG. 1A shows an IR-PM fiber made using the double crucible process (DCP) to form a cane 110 having a core 112 surrounded by a cladding 114. The cane 110 has a core diameter, D1, between 20 μm and 3 mm, an outer diameter, D2, between 1 and 3 mm, and a core/clad ratio, or D1/D2. The cane 110 is subsequently compressed to form a compressed cane 111 with an approximately elliptical transverse cross-section and an approximately elliptical core 113 (FIG. 1A). The compressed cane 111 is inserted into a jacket tube 118 forming an assembly 119 where there is air space 116 between the compressed cane 111 and the jacket tube 118 (FIGS. 1B and 1C). The assembly 119 is subsequently stretched on a fiber optic drawing tower into a fiber 120 comprising a fiber core 122, a fiber cladding 124, an over-cladding 128, and a boundary between the cladding and over-cladding 126 (FIG. 1D). In one embodiment, the cane 110 is compressed on the fiber draw tower in-situ with the cane-forming step wherein a pair of compression rollers (or similar) applies a compressive force to the cane 110 after it exits the crucible. In another embodiment, the compression occurs off-line by placing the cane 110 collected from the draw tower into a press, heating the press and cane to a temperature, T, where Tg+10<T<Tg+75, where Tg is the glass transition temperature. The elliptical compressed cane 111 is then inserted into a jacket tube 118 with a hole having an internal diameter close fitting the outer diameter of the compressed cane 111 forming an assembly 119. In one embodiment, the tube 118 has a round hole slightly larger than the long axis of the elliptical cane (FIG. 1). In another embodiment, the tube 118 has an elliptical hole with a long internal diameter (LID) and short internal diameter (SID) such that the LID is slightly (<20%) larger than the long outer diameter (LOD) of the compressed cane 111 and the SID is slightly (<20%) larger than the short outer diameter (SOD) of the compressed cane 111 (FIG. 1C). The assembly 119 is then stretched into a PM fiber using in-situ preform consolidation technique wherein the assembly 119 is heated at its distal end until it slumps under its own weight forming a tapered region and a drop, a vacuum is applied to the void between the elliptical cane and the tube, the drop is collected forming a fiber between the drop and the proximal end of the assembly. The fiber is then formed by pulling from the assembly 119, while the assembly 119 is simultaneously fed into the hot zone of the fiber drawing furnace and a vacuum is continuously applied. In one embodiment, the cane and tube assembly is fused prior to the drawing step. In this embodiment, the assembly is placed under vacuum, the distal end of the assembly is heated such that the cane and tube completely fuse at the distal end, subsequently the proximal end of the assembly is heated such that the cane and tube completely fuse at the proximal end sealing a void along the length of the assembly comprising a vacuum. In some embodiments, this void is consolidated by subsequently heating the assembly and applying high pressure (about 1000-3000 psi). In some embodiments, a compression band comprising heat-shrink tubing or similar mechanical device is applied to the outside of the tube on at least one of the proximal end, the distal end, or the entire length of the assembly. Fibers formed from this method have birefringence greater than about $10^{-5}$. In one embodiment, a preform 130 comprising a core 132 surrounded by a cladding 134 is constructed with a round transverse cross-sectional shape (FIG. 1E). A compressed preform 131 is formed by compressing the preform 130 perpendicular to the preform axis to deform the cross-sectional shape of both the compressed core 133 and the compressed cladding 135 into an approximately elliptical shape (FIG. 1F). The cross-sectional shape of the compressed cladding 135 is made round by grinding, polishing and/or machining (FIG. 1G). Then a fiber 140 comprising a fiber core 142 surrounded by a fiber cladding 144 is drawn (FIG. 1H) in a manner consistent with preform fiber drawing. In some embodiments, the fiber 140 comprises at least one chalcogenide glass comprising at least one chalcogen element (S, Se or Te) and other elements including, but not limited to, Ge, As, Ga, Sn, Sb, Pb, Bi.

Fiber and Method 2: IR-PM Fiber with Elliptical Core Driven by Surface Tension During Preform Drawing As shown in FIGS. 2A-2D, an IR-PM fiber 240 having an elliptical core 222 surrounded by a round cladding 224 (FIGS. 2B and 2D) is fabricated by stretching a preform 230 on a fiber optic draw tower to form a fiber with a group birefringence greater than about $10^{-4}$. The preform 230 comprises a core 212, comprising a first IR-transmitting glass and having a circular transverse cross-sectional shape, surrounded by a cladding 214, comprising a second IR-transmitting glass and having a transverse cross-sectional shape that is not a circle (FIGS. 2A and 2C). In one embodiment, the transverse cross-sectional shape of the cladding 214 is elliptical or approximately elliptical (FIG. 2A). In another embodiment, the transverse cross-sectional shape of the cladding 214 is approximately circular, but with two truncated or flattened sides (FIG. 2C). During the preform fiber drawing process of the present invention, the preform 230 is held vertically in a fiber drawing oven, such that the distal end of the preform is heated until it slumps under its own weight forming a tapered section and a drop. The drop is then pulled at a controlled rate forming a fiber with a diameter between about 50 μm and 500 μm while the preform 230 is fed into the oven at another controlled rate. The temperature of the preform 230 in the tapered section is about between 50° C. and 150° C. greater than the Tg of the glass comprising the preform 230, and the viscosity of the glass comprising the preform is about $10^4$-$10^6$ Poise. Surface tension at this viscosity causes the transverse cross-sectional shape of the fiber cladding 224 to become round in the fiber 240 (FIGS. 2B and 2D) thereby causing the fiber core 222, which was round in the preform 230 (FIGS. 2A and 2C), to become elliptical as glass flows during the fiberization. In some embodiments, the IR-transmitting glass of the core comprises a chalcogenide glass. In some embodiments, the IR-transmitting glass of the cladding comprises a chalcogenide glass comprising at least one chalcogen element (S, Se or Te) and other elements including, but not limited to, Ge, As, Ga, Sn, Sb, Pb, Bi. In one embodiment, at least one of the core glass or the cladding glass comprises a chalcohalide glass. In one embodiment, at least one of the core glass or the cladding glass comprises a heavy-metal oxide glass. In one embodiment, at least one of the core glass or the cladding glass comprises a fluoride glass. In some embodiments, the preform is fabricated by extruding the second IR-transmitting glass through a suitable die to form a tube with a round hole and a non-round outer transverse cross-sectional shape, inserting a solid rod with round transverse cross-sectional shape and comprising the first IR-transmitting glass, into the hole in the tube. In some embodiments, the preform is fabricated by traditional rod-in-tube methods with a round transverse cross-sectional shaped cladding that is modified by grinding, polishing or machining to have a non-round shape (FIG. 2C), prior to drawing into fiber.

Fiber and Method 3: IR-PM Fiber with Elliptical Core by DCP Drawing

As shown in FIGS. 3A-3F, an IR-PM fiber 340 transmitting infrared light with a group birefringence greater than about $10^{-4}$ has a solid core 322 with an approximately elliptical transverse cross-sectional shape and comprising a first IR-transmitting glass and a solid cladding 324 comprising a second IR-transmitting glass (FIGS. 3C and 3F). The fiber 340 is drawn using the double crucible process (DCP) wherein at least one of the crucibles has a non-round transverse shaped exit aperture or tip. In one embodiment, the core crucible has a core tip 311 and a core channel 313 that each have an elliptical transverse cross-sectional shape with a ratio of long internal diameter to short internal diameter (LID/SID) between 1.5 and 3 (FIG. 3D) to provide an approximately elliptical shape to the core glass 312 as it exits the die (FIG. 3E). The clad crucible has a clad tip 315 and a clad channel 317 that each have a round transverse cross-sectional shape (FIG. 3D) to provide an approximately round shape to the clad glass 314 (FIG. 3E). In another embodiment, the core tip 311 and core channel 313 each have a round transverse cross-sectional shape (FIG. 3A) to provide an approximately round shape to the core glass 312 (FIG. 3B). The clad tip 315 and the clad channel 317 each have an elliptical transverse cross-sectional shape with a ratio of long internal diameter to short internal diameter (LID/SID) between 1.5 and 3 (FIG. 3A) to provide an approximately elliptical shape to the clad glass 314 upon exit from the crucible (FIG. 3B). Due to surface tension, the clad glass 314 becomes round during the fiber draw and thereby forces the fiber core 322 to become approximately elliptical while the fiber cladding 324 is approximately round (FIG. 3C). In some embodiments, the fiber comprises at least one chalcogenide glass comprising at least one chalcogen element (S, Se or Te) and other elements including, but not limited to, Ge, As, Ga, Sn, Sb, Pb, Bi.

Fiber and Method 4: IR-PM Fiber with Stress-Induced Birefringence

An IR-PM fiber 440 transmitting infrared light with a group birefringence greater than about $10^4$ has a solid core 422 comprising a first chalcogenide glass, a solid cladding 424 comprising a second chalcogenide glass, and at least two solid stressor members 423 comprising a third chalcogenide glass (FIG. 4E). The core 422 has a diameter as small as 4 μm and as large as 20 μm and is located entirely within the cladding 424 having a diameter of as small as 50 μm and as large as 500 μm or larger. The stressors 423 are on either side of the core 422, each has a diameter as small as 10 μm and as large as 200 μm, and the diameters of each are about the same as each other and entirely within the cladding 424. The first chalcogenide glass comprises at least one chalcogen element (S, Se or Te) and other elements including, but not limited to, Ge, As, Ga, Sn, Sb, and any combination thereof, transmits infrared light from between about 1 μm to about 12 μm or greater, depending on composition; and has a coefficient of thermal expansion, CTE1. The second chalcogenide glass comprises at least one chalcogen element (S, Se or Te) and other elements including, but not limited to, Ge, As, Ga, Sn, Sb, and any combination thereof, transmits infrared light from between about 1 μm to about 12 μm or greater, depending on composition; and has a coefficient of thermal expansion, CTE2. The third chalcogenide glass comprises at least one chalcogen element (S, Se or Te) and other elements including, but not limited to, Ge, As, Ga, Sn, Sb, and any combination thereof, transmits infrared light from between about 1 μm to about 12 μm or greater, depending on composition; and has a coefficient of thermal expansion, CTE3. The thermal expansion coefficient of the first and second glasses (CTE1 and CTE2) are between about 20 and 27 ppm/° C. The softening temperatures of the three glasses are about the same, such that the glass transition temperature (Tg) of each glass is no more than 10° C. higher or lower than the other glasses. In one embodiment, the CTE3 is between 2 and 10 ppm/° C. lower than CTE2. In another embodiment, the CTE3 is between 4 and 10 ppm/° C. higher than CTE2. In one embodiment, the stressor members 423 have a circular transverse cross-sectional shape. In one embodiment, the first chalcogenide glass comprises As and S, the second chalcogenide glass comprises As and S, and the third chalcogenide glass comprises As, Se, Te and Ge. In one embodiment, the first chalcogenide glass comprises As and S, the second chalcogenide glass comprises As and S, and the third chalcogenide glass comprises at least one halogen element (I, Br, Cl, or F). In one embodiment, the first chalcogenide glass comprises As and Se, the second chalcogenide glass comprises As and Se, and the third chalcogenide glass comprises As and S with greater than 60 atomic % of S. In some embodiments, the third IR glass comprising the stressor members 423 has a refractive index smaller than those of the first and second IR glasses.

A method of making said fiber 440 wherein three separate parts are first fabricated: a core cane 412 (FIG. 4A), a cladding preform 414 (FIG. 4B) having multiple openings 415 and 416, and a pair of stressor canes 413 (FIG. 4C). The parts are assembled by inserting the core cane 412 and stressor canes 413 into designated openings, 415 and 416 respectively, in the cladding preform 414 to form an assemblage 430 (FIG. 4D). As shown in FIG. 4D, there may be interstitial space 417 between the canes 412, 413 and the cladding preform 414 in the assemblage 430. The assemblage 430 is stretched into an IR-PM fiber 440 (FIG. 4E). The core cane 412, has a diameter of as small as 100 μm and as large as 2 mm or possibly larger or smaller, comprises the first chalcogenide glass, and is formed by casting, stretching or extruding the first chalcogenide glass. The cladding preform 414 has a diameter as small as 5 mm and as large as 25 mm or possibly larger, comprises a plurality (3 in this example) of openings, and is formed by passing the second chalcogenide glass through an extrusion die. The stressor canes 413 comprise the third chalcogenide glass, have a diameter of as small as 1 mm and as large as 12 mm or possibly larger, and are formed by casting, stretching or extruding the third chalcogenide glass. In one embodiment, the assemblage 430 is fused after assembly but prior to drawing into fiber by means of heating of the assemblage 430. In another embodiment, the assemblage 430 is held together with a fixture and a vacuum is applied to the interstitial space 417 between the canes 412, 413 and the cladding preform during the fiber draw step. In one embodiment, the core cane 452 comprises an inner core glass 453 and an outer clad glass coating 454 (FIG. 4F). The inner core glass 453 comprises the first chalcogenide glass, and the outer clad glass coating 454 comprises the second chalcogenide glass. This core cane 452 is fabricated by the simultaneous flow of two different molten glasses through a crucible with concentric openings, the co-extrusion of two different glasses through an extrusion die, or by assembling a core rod inside a thin cladding tube, and stretching the assemblage into a core cane 452.

Fiber and Method 5: IR-PM MOF

Figures 5A, 5B, 5C, 5D, 5E:
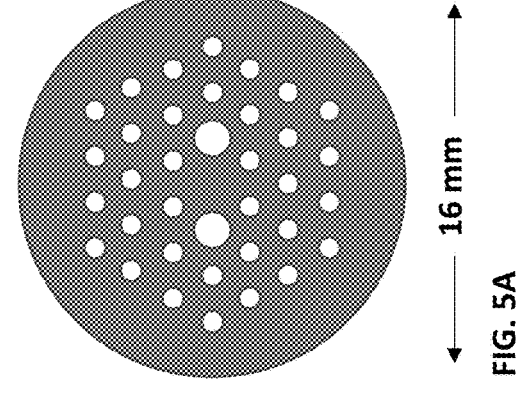
FIGS. 5A-5E show an IR-PM micro-structured optical fiber (MOF) and the preform thereof.

As shown in FIGS. 5A-5E, an IR-PM fiber transmitting infrared light, having a group birefringence greater than $10^{-4}$, comprises a first IR-transmitting glass, having a solid core, a series of longitudinal air-holes arranged in a lattice having a lattice pitch, Λ, having a diameter D1, and surrounding the core (FIG. 5A shows the preform). At least 3 and as many as 10 rings of air holes surround the core. In one embodiment, the core is birefringent by means of a pair of air-holes on either side of the core having a diameter D2 larger than the diameter of the rest of the holes, D1 (FIG. 5B). In one embodiment, the core is birefringent by means of all holes on either side of and colinear with the core having a diameter D2 larger than the diameter of the rest of the holes, D1 (FIG. 5C). In one embodiment, the core is birefringent by means of a second IR-transmitting glass 545 having a refractive index lower than the first TR-transmitting glass taking the place of a pair of air holes on opposing sides of the core (FIG. 5D). In some embodiments, birefringence is provided by means of substitution of the first TR-transmitting glass in place of at least 1 air holes adjacent to and colinear the core (FIG. 5E). In some embodiments, the fiber comprises at least one chalcogenide glass comprising at least one chalcogen element (S, Se or Te) and other elements including, but not limited to, Ge, As, Ga, Sn, Sb, Pb, Bi, and any combination thereof.

A method of fabricating the IR-PM fiber transmitting infrared light and having a group birefringence greater than $10^{-4}$, where the fiber is drawn on a fiber optic draw tower from a preform comprising a first IR-transmitting glass and having multiple openings. In some embodiments, the preform is fabricated by extruding the first IR-transmitting glass through a suitable die. In some embodiments, the preform is fabricated by drilling or mechanically abrading a plurality of holes in a solid rod comprising the first IR-transmitting glass. In some embodiments, at least 1 cane comprising a second IR-transmitting glass is inserted into at least 1 hole adjacent to the core in the preform prior to fiber drawing. In some embodiments, gas pressure is applied to at least 1 opening in the preform during the fiber draw process to maintain the ratio of hole diameter to hole pitch, D1/A, or to increase it compared to the ratio in the preform. In some embodiments, a first gas pressure is applied to the holes adjacent to the core and a second gas pressure is applied to the other holes. In this method, gas pressure may be positive or negative (e.g. applied by a vacuum) and may constitute nitrogen, argon, helium, some other inert or reactive gas, or any combination thereof.

Fiber and Method 6: IR-PM Solid MOF

Figures 6A, 6B, 6C, 6D, 6E, 6F:
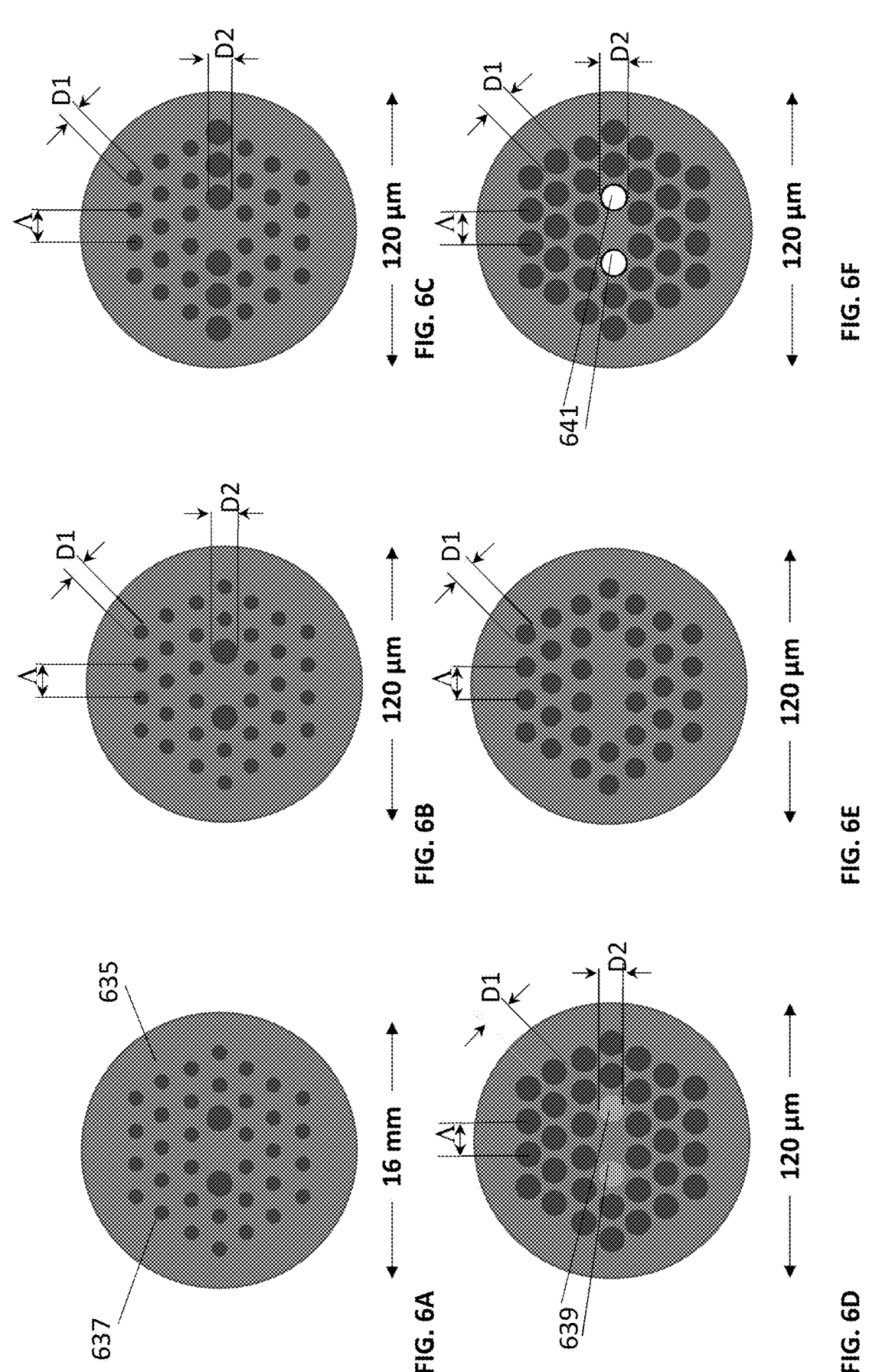
FIGS. 6A-6F show an IR-PM solid MOF and the preform thereof.

As shown in FIGS. 6A-6F, an IR-PM fiber transmitting infrared light, having a group birefringence greater than $10^{-4}$, comprises a first IR-transmitting glass 635 having a solid core and a series of longitudinal solid rods comprising a second IR-transmitting glass 637 having a refractive index different from that of the first glass, arranged in a lattice having a lattice pitch, Λ, having a diameter D1, and surrounding the core (FIG. 6A shows the preform). At least 3 and as many as 10 rings of rods surround the core. In one embodiment, the core is birefringent by means of a pair of rods on either side of the core having a diameter D2 larger than the diameter of the rest of the rods, D1 (FIG. 6B). In one embodiment, the core is birefringent by means of all rods on either side of and colinear with the core having a diameter D2 larger than the diameter of the rest of the rods, D1 (FIG. 6C). In one embodiment the core is birefringent by means of a third IR-transmitting glass 639 having a refractive index lower than the first IR-transmitting glass taking the place of a pair of rods on either side of the core and having a diameter D2 that may be equal to, larger than or smaller than the diameters of the remaining rods, D1 (FIG. 6D). In some embodiments, birefringence is provided by means of substitution of the first IR-transmitting glass in place of at least 1 rod adjacent to and colinear the core (FIG. 6E). In another embodiment, a pair of air holes 641 are adjacent to and on opposite sides of the core (FIG. 6F). In some embodiments, the fiber comprises at least one chalcogenide glass comprising at least one chalcogen element (S, Se or Te) and other elements including, but not limited to, Ge, As, Ga, Sn, Sb, Pb, Bi, or any combination thereof.

A method of fabricating the IR-PM fiber transmitting infrared light and having a group birefringence greater than $10^{-4}$, wherein the fiber is drawn on a fiber optic draw tower from a preform comprising a first IR-transmitting glass and a second IR-transmitting glass. In some embodiments, the preform is fabricated by extruding the first IR-transmitting glass through a suitable die such that the preform contains a plurality of longitudinal holes, into which a series of rods comprising the second IR-transmitting glass are inserted. In some embodiments, the preform is fabricated by drilling or mechanically abrading a plurality of holes in a solid rod comprising the first IR-transmitting glass and a series of rods comprising the second IR-transmitting glass are inserted. In some embodiments, at least 1 cane comprising a third IR-transmitting glass is inserted into at least 1 hole adjacent to the core in the preform prior to fiber drawing. In some embodiments, some of the holes do not contain a rod and gas pressure is applied to at least one opening in the preform during the fiber draw process to maintain the ratio of hole diameter to hole pitch, D1/A, or to increase it compared to the ratio in the preform. In this method, gas pressure may be positive or negative (e.g. applied by a vacuum) and may constitute nitrogen, argon, helium, some other inert or reactive gas, or any combination thereof.

Fiber and Method 7: IR-PM Anti-Resonant Fiber

Figures 7A, 7B, 7C, 7D, 7E:
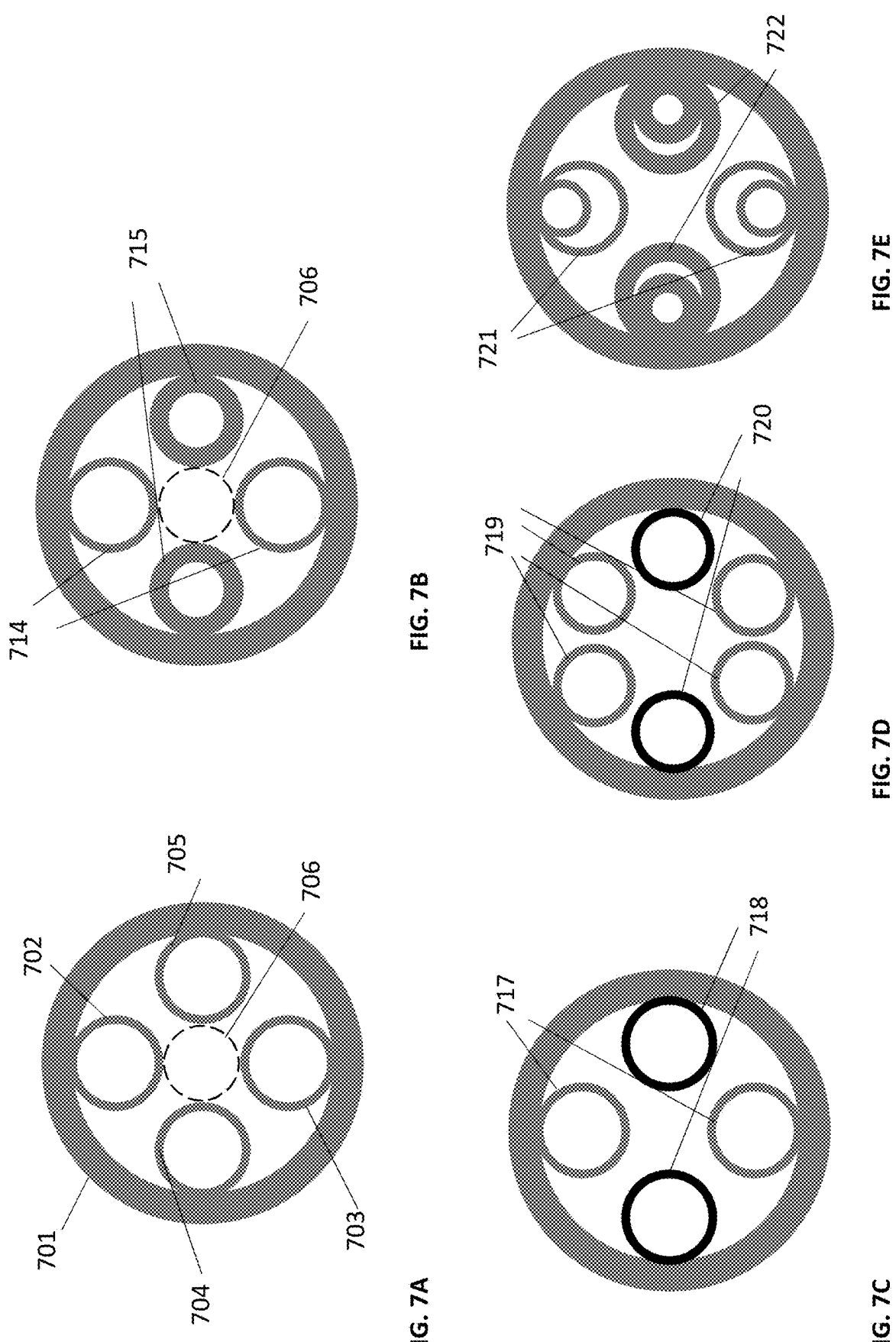
FIGS. 7A-7E show an IR-PM fiber using anti-resonance or inhibited coupling mechanisms.

FIGS. 7A-7E show an TR-PM fiber transmitting infrared light using anti-resonance or inhibited coupling mechanisms, having a group birefringence greater than about $10^{-4}$, comprising a first IR-transmitting glass and having a cladding comprising a series of at least four and as many as ten tube-like structures 702, 703, 704, 705 (FIG. 7A) each having a wall thickness, t, and an outer diameter, d, being arranged in a circular configuration in a single layer, such that adjacent tubes do not touch each other and are separated by a space, s, and being attached to an outer cladding tube 701 (FIG. 7A). The fiber has a hollow core region 706 (FIG. 7A) with diameter $d_{core}$ defined by the space between the tube-like structures. In some embodiments, the fiber is birefringent due to differences in at least two of the tube-like structures surrounding the hollow core region 706, wherein one set of the tube-like structures, termed B-tubes, colinear with each other and the core region 706 are different from the other tube-like structures, termed A-tubes. In some embodiments, the A-tubes 717 comprise a first IR-transmitting glass and the B-tubes 718 comprise a second IR-transmitting glass having a refractive index different from that of the first IR-transmitting glass (FIG. 7C). In some embodiments, the A-tubes 714 and B-tubes 715 comprise the same IR-transmitting glass, but the A-tubes have a different wall thickness ($t_A$) than the B-tubes ($t_B$), ($t_A \neq t_B$) (FIG. 7B). In some embodiments, the A-tubes 717 comprise a first IR-transmitting glass, and the B-tubes 718 comprise a second IR-transmitting glass and both sets of tubes have the same wall thickness ($t_A = t_B$) (FIG. 7C). In some embodiments, the A-tubes 719 comprise a first IR-transmitting glass, the B-tubes 720 comprise a second IR-transmitting glass, both sets of tubes have the same wall thickness, and there are an unequal amount of A-tubes and B-tubes (e.g. 4 A-tubes and 2 B-tubes) (FIG. 7D). In some embodiments, the A-tubes comprise a first IR-transmitting glass with a refractive index $n_A(\lambda)$ and the B-tubes comprise a second IR-transmitting glass with a second refractive index $n_B(\lambda)$, such that $n_A(\lambda) \neq n_B(\lambda)$ and the A-tubes have a different wall thickness ($t_A$) than the B-tubes ($t_B$), such that ($t_A \neq t_B$). In some embodiments, the tube-like structures 721, 722 are nested tubes wherein an inner tube with a smaller diameter, das or $d_{B2}$ for A-tube 721 or B-tube 722 positions respectively, is joined to an outer tube with a larger diameter, $d_{A1}$ or $d_{B1}$ for A-tube 721 or B-tube 722 sites respectively, at the same attachment point that joins the outer tube to the outer cladding tube as shown in FIG. 7E where the tube thicknesses are $t_{A1}$, $t_{A2}$, $t_{B1}$ and $t_{B2}$ for the large A-tubes, small A-tubes, large B-tubes and small B-tubes respectively. In some embodiments, $t_{A1} = t_{A2}$, $t_{B1} = t_{B2}$, $d_{A1} = d_{B1}$, $d_{A2} = d_{B2}$, and $t_{B1} > t_{A1}$. In some embodiments, $t_{A1} = t_{A2}$, $t_{B1} = t_{B2}$, $d_{A1} = d_{B1}$, $d_{A2} = d_{B2}$, and $t_{B1} < t_{A1}$. In some embodiments, the A-tubes comprise a first IR-transmitting glass with a refractive index $n_A(\lambda)$ and the B-tubes comprise a second IR-transmitting glass with a second refractive index $n_B(\lambda)$, $t_{A1} = t_{A2} = t_{B1} = t_{B2}$, $d_{A1} = d_{B1} = d_{A2} = d_{B2}$, and $n_A(\lambda) \neq n_B(\lambda)$. Although the example shown in FIG. 7E shows four total tube positions, two A-tube positions 721 and two B-tube positions 722, the number of positions may be greater, for example ten where eight are A-tube positions and two are B-tube positions or six are A-tube positions and four are B-tube positions. In some embodiments, the first IR-transmitting glass comprises a first chalcogenide glass consisting of at least one element from the group of sulfur, selenium and tellurium and at least one other element, such as but not limited to, arsenic, germanium, gallium, antimony, and any combination thereof, and the second IR-transmitting glass comprises a second chalcogenide glass consisting of at least one element from the group of sulfur, selenium and tellurium and at least one other element, such as but not limited to, arsenic, germanium, gallium, antimony and any combination thereof.

A method of fabricating an IR-PM fiber wherein a preform having the same features as desired in the fiber, but larger in scale and perhaps with different dimensional proportions or ratios, is drawn on a fiber optic draw tower at an elevated temperature. In some embodiments of the method, the preform is fabricated by extruding an IR-transmitting glass through a suitable die at an elevated temperature. In some embodiments, at least one gas pressure is applied to at least one of the openings in the preform using an inert gas such as nitrogen, helium, argon, or other gas or a vacuum. In some embodiments of the method, at least two different IR-transmitting glasses are co-extruded through a suitable die at an elevated temperature to produce a preform having tubes with different glass compositions on the A- and B-tube positions. In some embodiments of the method, the preform is fabricated by assembling suitable tubes, each comprising a suitable IR-transmitting glass, in a suitable arrangement such that the tubes contact an outer cladding tube and are separated from each other by means of a suitable jig that may be present at one or both ends of the assemblage or assembled preform. In some embodiments, the jig comprises a material including but not limited to a glass, a polymer, an epoxy, or a metal. In some embodiments, at least part of the assembled preform is heated, prior to drawing into fiber, to fuse the individual tubes to the outer cladding tube.

Fiber and Method 8: IR-PM Chiral or Twisted Fiber

Figure 8B:
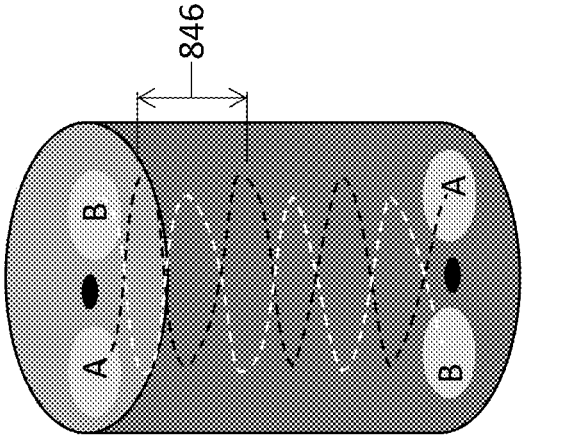
FIGS. 8A-8B show an IR-PM chiral fiber.
Figure 8A:
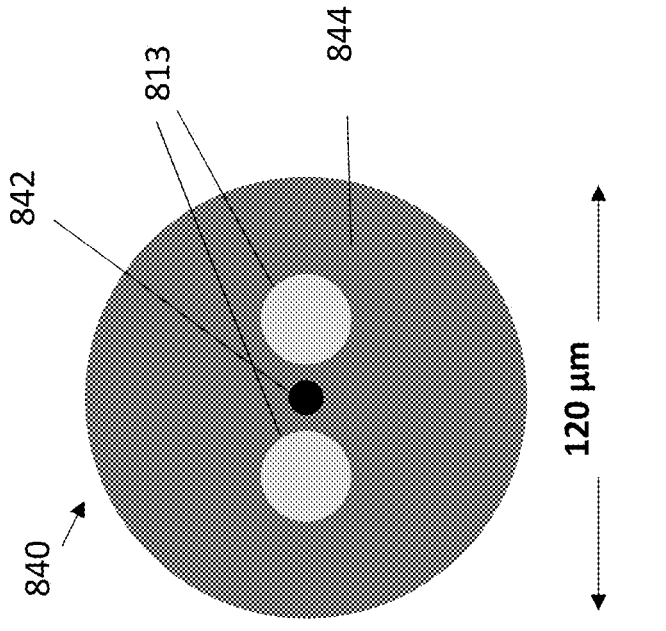

FIGS. 8A and 8B show a circular-polarization maintaining IR-transmitting optical fiber 840 having a solid core 842 comprising a first IR-transmitting glass surrounded by a cladding 844 comprising a second IR-transmitting glass having a refractive index lower than that of the first glass, and having at least one stressor member 813 comprising a third glass. The stressor member(s) 813 run the entire length of the optical fiber 840, are coiled around the solid core 842, and are positioned close to the core 842 such that the core 842 has a stress-induced birefringence oriented within the transverse plane, in a direction defined by the location of the stressor member(s) 813 relative to the core as shown in FIG. 8A. Since the stressor member(s) 813 are coiled around the fiber core 842 (FIG. 8B), the direction of the birefringence vector, along the length of the fiber, rotates around the core but is confined to the transverse plane such that the fiber 840 transmits and maintains the circular polarization of the light introduced to it. In one embodiment, the circular-polarization maintaining IR fiber 840 has one stressor member 813, adjacent to and coiled around the fiber core 842. In another embodiment, the circular-polarization maintaining IR fiber 840 has two stressor members 813 adjacent to and coiled around the fiber core 842 with a common pitch 846 and coiling direction (e.g. left-hand wound) such that at any transverse cross section, the fiber core 842 and both stressor members 813 are collinear (FIG. 8B). In some embodiments, the first IR-transmitting glass is a chalcogenide glass comprising at least one chalcogen element (S, Se or Te) and other elements including, but not limited to, Ge, As, Ga, Sn, Sb, Pb, Bi, and any combination thereof. The second IR-transmitting glass is a chalcogenide glass comprising at least one chalcogen element (S, Se or Te) and other elements including, but not limited to, Ge, As, Ga, Sn, Sb, Pb, Bi, and any combination thereof. In some embodiments, the third glass transmits IR light and has a refractive index lower than that of the second glass.

A method to fabricate a circular-polarization maintaining IR-transmitting optical fiber wherein a preform having a solid core comprising a first IR-transmitting glass surrounded by a cladding comprising a second IR-transmitting glass having a refractive index lower than that of the first glass, and having at least one stressor member comprising a third glass is drawn into an optical fiber on a fiber optic draw tower using the preform draw method. The preform is rotated about its axis throughout the drawing. In some embodiments, the preform is rotated at a constant rate. In some embodiments the preform is fabricated by drilling a core hole and at least one other hole in a rod comprising the second glass and inserting a cane of the first glass into the core hole and a cane comprising the third glass into each of the other holes, and then heating the assemblage to fuse the rods and canes. In some embodiments, a vacuum is used to remove voids during the preform fusing step.

Fiber and Method 9: IR Fiber with Endface Polarizer

FIGS. 9A-9F show an infrared-transmitting fiber 920 having a solid core 905 (FIG. 9B) comprising at least one IR-transmitting material, a proximal endface 902 and a distal endface 904 (FIG. 9A), where at least one of said endfaces 902, 904 incorporates a polarizing structure 906 comprising at least one conductive material. In some embodiments, the polarizing structure 906 comprises a series of features such as linear ridges and valleys, and a metal 942, such as aluminum, applied to at least part of the ridges and/or valleys forming metallic lines, and said features are arranged in a repeating periodic pattern having a spacing or pitch 946 between adjacent features (FIG. 9B). In the example shown in FIG. 9B, the features cover about 50% of the endface including the core 905. The spacing or pitch 946 is narrower than the wavelength of light being transmitted by the fiber, and in some embodiments the pitch 946 is about 1000 nm. The height of the ridges 948 relative to the bottom of the valleys is in the range 100-1000 nm or larger depending on the wavelength of light being transmitted by the fiber. The thickness of the metal features is in the range of 20-100 nm or larger, and the width 947 is typically about 20-50% of the pitch, but may vary from those sizes. The features on the fiber endface, particularly the conductive metal lines, allow the transmission of light polarized in the direction perpendicular to the direction of the metal lines and suppress light polarized in the direction parallel to the lines with a large extinction ratio (about 10 dB or greater). In some embodiments, the polarizing structure is on one endface but not the other; in other embodiments, both endfaces have the polarizing structure. In some embodiments, the fiber comprises an IR-transmitting glass, such as a chalcogenide glass comprising at least one chalcogen element (S, Se or Te) and other elements including, but not limited to, Ge, As, Ga, Sn, Sb, Pb, Bi, or any combination thereof. In some embodiments, the fiber comprises a solid cladding. In some embodiments, the fiber has other polarization maintaining features such as those described elsewhere in this disclosure, and the polarizing endface features are in a direction compatible with the polarization maintaining features in the fiber. In some embodiments, the polarizing endface features are part of a cap or separate part that has been affixed to the endface of the fiber, which in said embodiments may have hollow light guiding cores instead of solid cores.

A method to fabricate an infrared-transmitting optical fiber having a polarizing structure on at least one fiber endface, has the following steps: (1) Ridges and valleys are formed on the endface of the fiber 920 either by nano-indenting, where a mold 960 or shim having a negative relief of the desired features is pressed into the fiber endface deforming it into the desired texture (FIGS. 9C and 9D), or by an etching process such as reactive ion etching. (2) A conductive metal, such as aluminum, gold, silver, platinum or other, is deposited using a line-of-sight deposition process including, but not limited to sputtering, thermal evaporation, or another method. In some embodiments, the deposition is performed at an angle such that the ridges block part of the valleys thereby precluding deposition on part of the structure as shown in FIG. 9E. The metal may be deposited in one direction first (FIG. 9E) and then deposited a second time in the opposite direction (FIG. 9F) to make wider metal features, although this is not a requirement of the invention. In some embodiments, the ridges and valleys have square or approximately square cross-sectional shapes. In other embodiments, the ridges and valleys have sharp or approximately triangular cross-sectional shapes as shown in FIGS. 9B-9F. Sharpness of the indented features is not a requirement of the method.

In another embodiment, the first step of indenting the fiber endface using a mold is omitted and a shadow mask is used to form the pattern during the deposition step.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A method of making an infrared-transmitting, polarization maintaining (IR-PM) optical fiber, comprising:

making a preform with an approximately round cross-sectional shape comprising an approximately round core surrounded by a cladding, wherein the preform comprises an infrared-transmitting, non-silica glass;

compressing the preform to form a compressed preform where both the core and cladding have an approximately elliptical shape;

altering the compressed preform by grinding, polishing, machining, or any combination thereof to make an altered preform with an approximately round cladding; and drawing the altered preform into a fiber that is approximately round with an approximately elliptical core, wherein the fiber has a birefringence greater than $10^{-5}$.

2. The method of claim 1, wherein the infrared-transmitting, non-silica glass comprises a chalcogenide glass comprising at least one of sulfur, selenium, and tellurium; a glass based on an oxide of at least one of Te, Ge, Pb, and La; a fluoride glass, or any combination thereof.

* * * * *